United States Patent
Lee et al.

(10) Patent No.: US 10,330,176 B2
(45) Date of Patent: Jun. 25, 2019

(54) POWER TRANSMISSION APPARATUS FOR VEHICLE

(71) Applicant: HYUNDAI MOTOR COMPANY, Seoul (KR)

(72) Inventors: Sueng Ho Lee, Seoul (KR); Dongwon Kim, Osan-si (KR); Seongwook Ji, Gunpo-si (KR); Ki Dong Kim, Anyang-si (KR); Jihun Lee, Seoul (KR); Ma Ru Kang, Yongin-si (KR); Hyun Sik Kwon, Seoul (KR); Sun Sung Kwon, Anyang-si (KR); Ki Tae Kim, Incheon (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 281 days.

(21) Appl. No.: 15/380,542

(22) Filed: Dec. 15, 2016

(65) Prior Publication Data
US 2018/0112743 A1   Apr. 26, 2018

(30) Foreign Application Priority Data
Oct. 21, 2016   (KR) .................... 10-2016-0137780

(51) Int. Cl.
| | | |
|---|---|---|
| *F16H 3/08* | (2006.01) | |
| *F16H 3/085* | (2006.01) | |
| *F16H 3/00* | (2006.01) | |
| *F16H 3/093* | (2006.01) | |

(52) U.S. Cl.
CPC ............ *F16H 3/085* (2013.01); *F16H 3/006* (2013.01); *F16H 3/093* (2013.01); *F16H 2003/0822* (2013.01); *F16H 2003/0931* (2013.01); *F16H 2200/0069* (2013.01)

(58) Field of Classification Search
CPC .......... F16H 3/085; F16H 3/006; F16H 3/093; F16H 2003/0822; F16H 2003/0931; F16H 2200/0065; F16H 37/021; F16H 2003/007; F16H 2003/008; B60K 6/36; B60K 6/38; B60K 6/44; B60K 6/547
See application file for complete search history.

(56) References Cited

U.S. PATENT DOCUMENTS

| | | | |
|---|---|---|---|
| 7,383,749 B2 | 6/2008 | Schafer et al. | |
| 7,610,825 B2 * | 11/2009 | Hendrickson | ........... F16H 3/006 74/330 |
| 7,870,804 B2 * | 1/2011 | Bjorck | .................... F16H 3/006 74/330 |
| 8,333,126 B2 * | 12/2012 | Enstroem | ................ F16H 3/006 74/330 |
| 8,622,862 B2 * | 1/2014 | Koyama | .................. B60K 6/36 180/65.21 |

(Continued)

FOREIGN PATENT DOCUMENTS

| | | |
|---|---|---|
| KR | 10-1063654 B1 | 9/2011 |
| KR | 10-1509982 B1 | 4/2015 |

*Primary Examiner* — Zakaria Elahmadi
(74) *Attorney, Agent, or Firm* — Knobbe Martens Olson & Bear LLP (57) ABSTRACT

Ten forward speeds and one reverse speed are achieved by a power transmission apparatus for a vehicle including a double clutch, a plurality of input, output, and idle shafts, a plurality of gears fixed to or rotatable on the shafts, a plurality of synchronizers selectively synchronizing gears to the shafts.

13 Claims, 6 Drawing Sheets

(56) References Cited

U.S. PATENT DOCUMENTS

| | | | |
|---|---|---|---|
| 9,003,905 B1* | 4/2015 | Lee | F16H 3/093 74/330 |
| 9,032,825 B2* | 5/2015 | Okubo | B60K 6/48 74/330 |
| 9,874,266 B2* | 1/2018 | Yang | F16H 3/006 |
| 2002/0033059 A1* | 3/2002 | Pels | B60K 6/26 74/329 |
| 2006/0230854 A1* | 10/2006 | Enstrom | B60K 6/36 74/331 |
| 2007/0199393 A1* | 8/2007 | Hattori | F16H 3/006 74/331 |
| 2007/0240530 A1* | 10/2007 | Ogami | F16H 63/18 74/330 |
| 2007/0289399 A1* | 12/2007 | Tanba | F16H 61/0059 74/330 |
| 2008/0202267 A1* | 8/2008 | Hendrickson | F16H 3/006 74/331 |
| 2009/0266191 A1 | 10/2009 | Remmler | |
| 2011/0214533 A1* | 9/2011 | Koyama | B60W 10/02 74/665 A |
| 2012/0279333 A1* | 11/2012 | Yim | F16H 61/688 74/331 |
| 2013/0031990 A1* | 2/2013 | Singh | F16H 3/006 74/330 |
| 2014/0174228 A1* | 6/2014 | Lee | F16H 3/006 74/330 |
| 2014/0366665 A1* | 12/2014 | Mepham | F16D 23/06 74/330 |
| 2015/0096393 A1* | 4/2015 | Lee | F16H 3/12 74/330 |
| 2015/0119183 A1* | 4/2015 | Kwon | F16H 3/093 475/207 |
| 2016/0082822 A1* | 3/2016 | Huh | B60K 6/36 74/665 R |
| 2016/0091057 A1* | 3/2016 | Choi | B60K 6/442 74/665 B |
| 2016/0167503 A1* | 6/2016 | Lee | B60K 6/365 475/5 |
| 2016/0207392 A1* | 7/2016 | Zhang | F16H 3/006 |
| 2017/0122411 A1* | 5/2017 | Hiraiwa | F16H 3/006 |

* cited by examiner

| Shift-stage | CL1 | CL2 | SL1 | | SL2 | | | | SL3 | | | SL4 | | | SL5 | | SL6 | | SL7 | |
|---|---|---|---|---|---|---|---|---|---|---|---|---|---|---|---|---|---|---|---|---|
| | | | D1 | N | D9 | D2 | N | D8 | D5 | N | D7 | D10 | N | D4 | N | D6 | D3 | N | R | N |
| Reverse speed | | △ | | ○ | | | ○ | | | ○ | | | ○ | | ○ | | | ○ | ● | |
| N | | | | ○ | | | ○ | | | ○ | | | ○ | | ○ | | | ○ | | ○ |
| Forward 1-th speed | △ | | ● | | | | ○ | | | ○ | | | ○ | | ○ | | | ○ | | ○ |
| Forward 2-th speed | | △ | | ○ | | ● | | | | ○ | | | ○ | | ○ | | | ○ | | ○ |
| Forward 3-th speed | △ | | | ○ | | | ○ | | | ○ | | | ○ | | ○ | | ● | | | ○ |
| Forward 4-th speed | | △ | | ○ | | | ○ | | ● | | | | ○ | | ○ | | | ○ | | ○ |
| Forward 5-th speed | △ | | | ○ | | | ○ | | | ○ | | | ○ | | | ● | | ○ | | ○ |
| Forward 6-th speed | | △ | | ○ | | | ○ | | | ○ | | | | ● | ○ | | | ○ | | ○ |
| Forward 7-th speed | △ | | | ○ | | | ○ | | | | ● | | ○ | | ○ | | | ○ | | ○ |
| Forward 8-th speed | | △ | | ○ | | | | ● | | ○ | | | ○ | | ○ | | | ○ | | ○ |
| Forward 9-th speed | △ | | | ○ | ● | | | | | ○ | | | ○ | | ○ | | | ○ | | ○ |
| Forward 10-th speed | | △ | | ○ | | | ○ | | | ○ | | ● | | | ○ | | | ○ | | ○ |

△ : Clutch operation    ● : Shifting position    ○ : Neutral position

FIG. 6

POWER TRANSMISSION APPARATUS FOR VEHICLE

CROSS-REFERENCE TO RELATED APPLICATION

This application claims priority to and the benefit of Korean Patent Application No. 10-2016-0137780 filed in the Korean Intellectual Property Office on Oct. 21, 2016, the entire contents of which are incorporated herein by reference.

BACKGROUND (a) Field

The present invention relates to a power transmission apparatus for a vehicle utilizing a double clutch.

(b) Description of the Related Art

An environmentally-friendly technology of a vehicle is a core technology which controls survival of a future automobile industry, and advanced car makers have focused their energy on the development of an environmentally-friendly vehicle to achieve environmental and fuel efficiency regulations.

An electric vehicle (EV) or a hybrid electric vehicle (HEV) that utilizes electrical energy, or a double clutch transmission (DCT) improving efficiency and convenience of a transmission may be examples of such future vehicle technology.

The double clutch transmission (DCT) includes two clutch devices and a gear train of a basically manual transmission, selectively transmits a torque input from an engine to two input shafts by using the two clutch devices, and outputs a torque shifted by the gear train.

Such a double clutch transmission (DCT) attempts to compactly realize a multi-stage transmission of more than five speeds. The DCT achieves an automated manual transmission (AMT) that does not require manual shifting of a driver, by controlling two clutches and synchronizing devices by a controller.

In comparison with an automatic transmission using planetary gears, such a DCT shows merits, such as higher efficiency in power delivery, easier modification in revising or adding parts in order to achieve more shift-stages, etc., and thus gathers more spotlight since it can more comfortably conform with fuel consumption regulation and efficiency in achieving more shift-stages.

The disclosure of this section is to provide background of the invention. Applicant notes that this section may contain information available before this application. However, by providing this section, Applicant does not admit that any information contained in this section constitutes prior art.

SUMMARY

A power transmission apparatus for a vehicle according to an exemplary embodiment of the present disclosure includes a first input shaft, a second input shaft, a first shifting output device, a second shifting output device, a first idle unit, a second idle unit, and a reverse speed unit. The first input shaft may be disposed with at least one input gear and selectively connected with an output side of a power source by a first clutch. The second input shaft may be disposed with at least one input gear and selectively connected with the output side of a power source by a second clutch, the second input shaft being axially disposed with the first input shaft. The first shifting output device may include at least one shifting gear disposed on a first output shaft and first and second intermediate gears fixed to the first output shaft, the at least one shifting gear disposed on a first output shaft being externally engaged with a first group of input gears on the first and second input shafts, the at least one shifting gear disposed on a first output shaft being selectively synchronized with the first output shaft. The second shifting output device may include at least one shifting gear disposed on a second output shaft and a third intermediate gear fixed to the second output shaft, the at least one shifting gear disposed on the second output shaft being externally engaged with a second group of input gears on the first and second input shafts, the at least one shifting gear disposed on the second output shaft being selectively synchronized with the second output shaft. The first idle unit may include a first idle input gear fixed to a first idle shaft and two shifting gears externally engaged with the first and second intermediate gears and selectively synchronized with the first idle shaft, the first idle input gear being externally engaged with one shifting gear on the first output shaft. The second idle unit may include a second idle input gear fixed to a second idle shaft and a shifting gear externally engaged with the third intermediate gear and selectively synchronized with the second idle shaft, the second idle input gear being externally engaged with one shifting gear on the second output shaft. The reverse speed unit may include first and second reverse idle gears fixed to a reverse idle shaft and a reverse speed shifting gear disposed on and selectively synchronized with a reverse output shaft, the reverse idle shaft being coaxial with and rotatable with respect to the second output shaft, the reverse speed shifting gear receiving a torque of the second input shaft through the first and second reverse idle gears.

First, second, third, and fourth input gears may be sequentially disposed on the first input shaft. Fifth and sixth input gears may be disposed on the second input shaft. The first input gear may be an input gear for realizing the forward seventh speed and the forward third speed. The second input gear may be an input gear for realizing the forward first speed. The third input gear may be an input gear for realizing the forward fifth speed. The fourth input gear may be an input gear for realizing the forward ninth speed. The fifth input gear may be an input gear for realizing the forward second speed, the forward fourth speed, the forward sixth speed, and the reverse gear. The sixth input gear may be an input gear for realizing the forward eighth speed and the forward tenth speed.

The first shifting output device may include a forward first speed shifting gear and a forward ninth speed shifting gear disposed on the first output shaft, a first synchronizer for selectively synchronizing the forward first speed shifting gear and the forward ninth speed shifting gear to the first output shaft, a forward second speed shifting gear and a forward eighth speed shifting gear disposed on the first output shaft, a second synchronizer for selectively synchronizing the forward second speed shifting gear and the forward eighth speed shifting gear to the first output shaft, and a first output gear fixed to the first output shaft. The second shifting output device may include a forward fifth speed shifting gear and a forward seventh speed shifting gear disposed on the second output shaft, a third synchronizer selectively synchronizing the forward fifth speed shifting gear and the forward seventh speed shifting gear to the second output shaft, the forward tenth speed shifting gear disposed on the second output shaft, a fourth synchronizer selectively synchronizing the forward tenth speed shifting gear to the second output shaft, and a second output gear fixed to the second output shaft.

In the first shifting output device, the forward first speed shifting gear may be externally engaged with the second input gear, the forward ninth speed shifting gear may be externally engaged with the fourth input gear, the forward second speed shifting gear may be externally engaged with the fifth input gear, and the forward eighth speed shifting gear may be externally engaged with the sixth input gear. In the second shifting output device, the forward fifth speed shifting gear may be externally engaged with the third input gear, the forward seventh speed shifting gear may be externally engaged with the first input gear, and the forward tenth speed shifting gear may be externally engaged with the sixth input gear.

In the first idle unit, it may be arranged that the first idle shaft is disposed parallel with the first output shaft, the first idle input gear is fixed to the first idle shaft and externally engaged with the forward second speed shifting gear on the first output shaft, a forward fourth speed shifting gear is rotatably disposed on a central portion of the first idle shaft and externally engaged with the first intermediate gear on the first output shaft, a forward sixth speed shifting gear is rotatably disposed on the first idle shaft and externally engaged with the second intermediate gear on the first output shaft, and a fifth synchronizer selectively synchronizes the forward fourth speed shifting gear and the forward sixth speed shifting gear to the first idle shaft.

In the second idle unit, it may be arranged that the second idle shaft is disposed parallel with the second output shaft, the second idle input gear is fixed to the second idle shaft and externally engaged with the forward seventh speed shifting gear on the second output shaft, a forward third speed shifting gear rotatably disposed on the second idle shaft and externally engaged with the third intermediate gear on the second output shaft, and a sixth synchronizer selectively synchronizes the forward third speed shifting gear to the second idle shaft.

In the reverse speed unit, it may be arranged that the reverse idle shaft is coaxial with and rotatable with respect to the second output shaft, a first reverse idle gear is fixed to the reverse idle shaft and externally engaged with the fifth input gear on the second input shaft, a second reverse idle gear is fixed to the reverse idle shaft, the reverse output shaft is disposed parallel with the second output shaft, the reverse speed shifting gear is rotatably disposed on a central portion of the reverse output shaft and externally engaged with the second reverse idle gear, a seventh synchronizer selectively synchronizes the reverse speed shifting gear to the reverse output shaft, and a reverse output gear is fixed to the reverse output shaft.

The reverse idle shaft may be formed as a hollow shaft and overlaps an upstream portion of the second output shaft.

The first reverse idle gear may be larger than the second reverse idle gear in a diameter.

The forward third speed may be realized by synchronizing the forward third speed shifting gear to the second idle shaft by the operation of the sixth synchronizer and then operating the first clutch.

The forward fourth speed may be realized by synchronizing the forward fourth speed shifting gear to the first idle shaft by the operation of the fifth synchronizer and then operating the second clutch.

The forward sixth speed may be realized by synchronizing the forward sixth speed shifting gear to the first idle shaft by the operation of the fifth synchronizer and then operating the second clutch.

The reverse speed may be realized by synchronizing reverse speed shifting gear to the reverse output shaft by the operation of the seventh synchronizer and then operating the second clutch.

A power transmission apparatus for a vehicle according to an exemplary embodiment of the present disclosure may enable reduction in length by dispersedly disposing forward third, fourth, sixth, and reverse speed shifting gears on two idle shafts and a separate reverse output shaft.

In addition, production cost may be decreased by minimizing the increase in weight and the number of parts, and installability may be enhanced by the reduced length of a power transmission apparatus.

Further, effects that can be obtained or expected from exemplary embodiments of the present invention are directly or suggestively described in the following detailed description. That is, various effects expected from exemplary embodiments of the present invention will be described in the following detailed description.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

In this detailed description, front or upstream of the transmission is referred to as a side close to the engine, and rear or downstream of the transmission is referred to a side distal to the engine.

A power transmission apparatus for a vehicle having a double clutch transmission (DCT) configuration with at least ten forward speeds and a reverse speed is provided. In order for a DCT to achieve more shift-stages, the number of gears and synchronizing devices may be increased, which also results in an increase in length and weight of the DCT. More specifically, in some DCT configurations, an increase in the number of gears may cause an increase in the overall length of the transmission which may be undesirable if, for example, the transmission is mounted transversely in the vehicle. Further, when a hybrid vehicle is equipped with a DCT, it is particularly desirable to minimize the length of the DCT because the engine bay must also accommodate one or more drive motors in addition to the engine and the DCT.

In embodiments, the power transmission apparatus of the present disclosure includes a first input shaft IS1, a second input shaft IS2, a first output shaft OS1, a second output shaft OS2 and a final drive FD. Power and torque from an engine ENG is inputted to the power transmission apparatus at a first end and outputted to a final drive FD or differential DIFF at a second end. Clutches CL1, CL2 selectively connect one of the first and second input shafts IS1, IS2 to the crankshaft of the engine ENG. Power and torque from the engine ENG is transmitted from the first and second input shafts IS1, IS2, respectively, to the first and second output shafts OS1, OS2, respectively, by gears. The first and second output shafts OS1, OS2 are connected to the final drive FD by first and second output gear OG1, OG2, respectively.

The first and second input shafts IS1, IS2 extend along an axis between the first and second ends and are coaxial to each other. The first and second output shafts OS1, OS2 extend along an axis parallel to the first and second input shafts IS1, IS2 and connect the first and second input shafts IS1, IS2 to the final drive FD via the first and second output gears OG1, OG2. Speed shifting gears connected to the first and second input shafts IS1, IS2 and the first and second output shafts OS1, OS2 provide shift-stages of operation of the power transmission apparatus.

At least one additional shaft IDS1, IDS2, ROS extends along an axis between the first and second ends. The axis of the at least one additional shaft IDS1, IDS2, ROS is positioned radially outward of the first and second output shafts OS1, OS2 relative to the coaxial first and second input shafts IS1, IS2. The at least one additional shaft IDS1, IDS2, ROS is connected to the first and second input shafts IS1, IS2 and the first and second output shafts OS1, OS2 by speed shifting gears such that the at least one additional shaft IDS1, IDS2, ROS provides additional shift-stages of operation of the power transmission apparatus.

Figure 1:
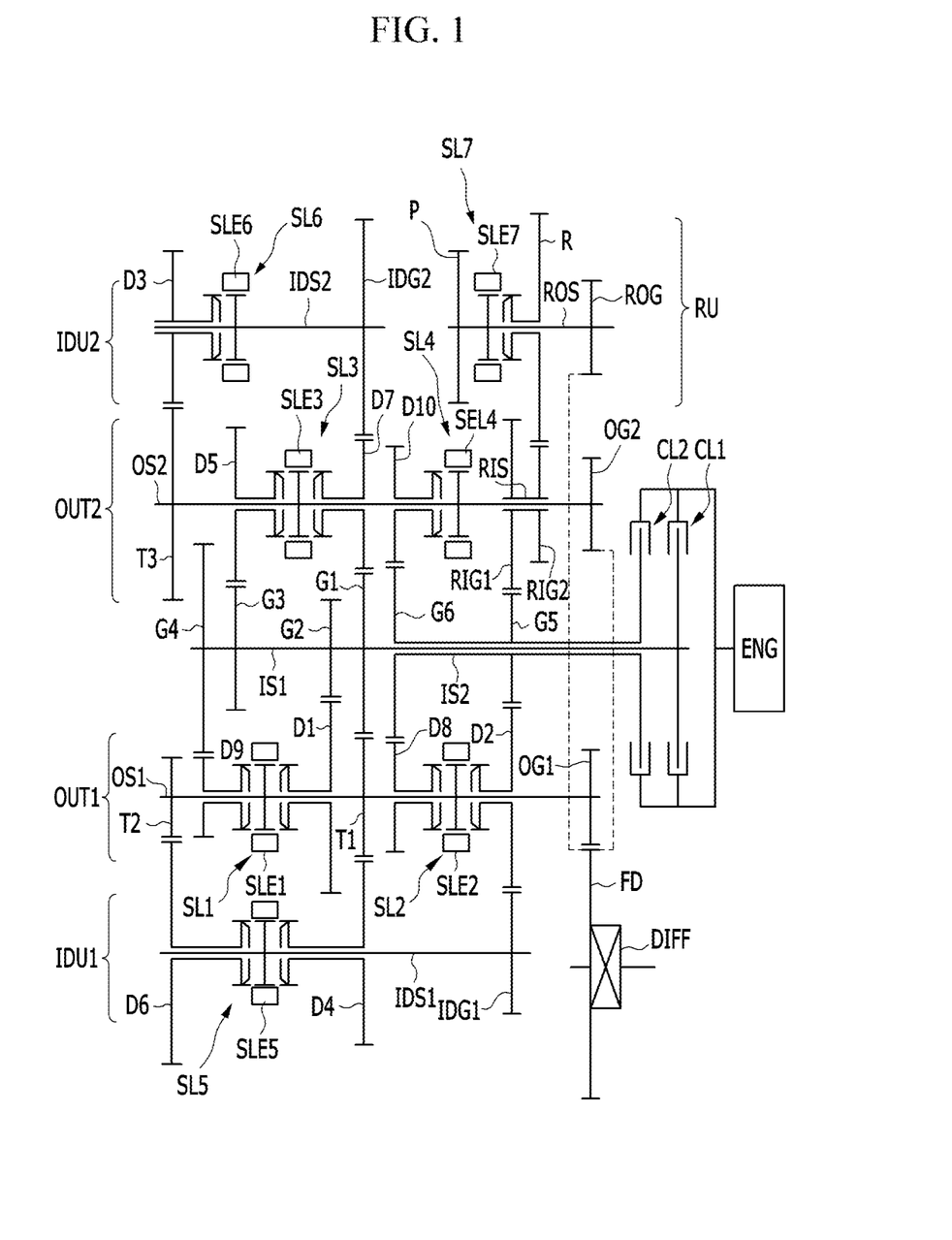
FIG. 1 is a gear layout view of a power transmission apparatus for a vehicle according to an exemplary embodiment of the present disclosure.

In embodiments, the shift-stages of operation provided by the first and second input shafts IS1, IS2 and the first and second output shafts OS1, OS2 may be described as follows. With reference to FIG. 1, when speed shifting gear D1 is engaged (i.e., driven), the first clutch CL1 is engaged and synchronizer SL1 engages speed shifting gear D1. Torque from the input shaft IS1 is transferred to the speed shifting gear D1 by the input gear G2 which drives output shaft OS1. Torque from the output shaft OS1 is transferred to the final drive FD and the differential DIFF of the vehicle by the output gear OG1.

Figure 5:
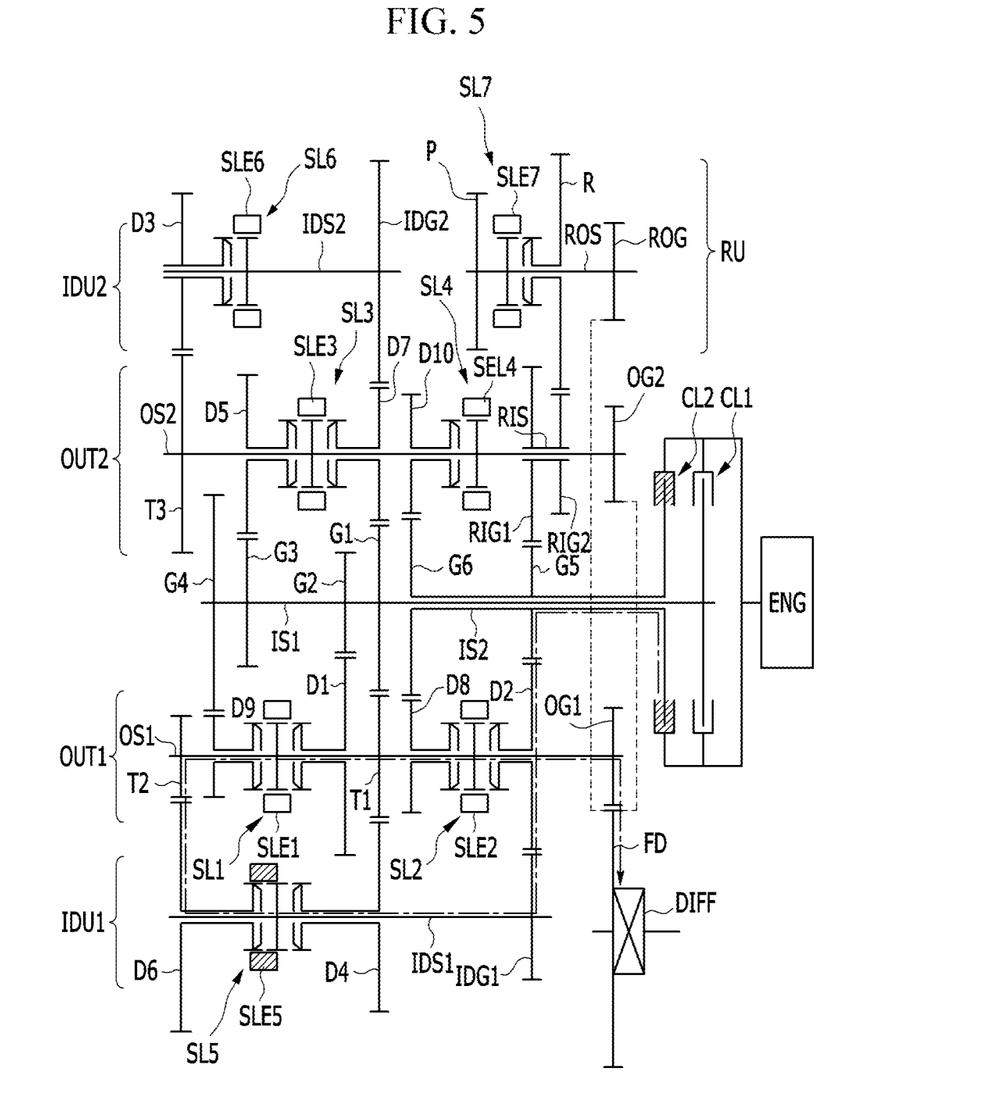
FIG. 5 is a power delivery path diagram at a forward sixth speed of a power transmission apparatus for a vehicle according to an exemplary embodiment of the present disclosure.

In embodiments, the additional shift-stages of operation provided by the first and second input shafts IS1, IS2, the first and second output shafts OS1, OS2, and the at least one additional shaft IDS1, IDS2, IDS3 may be described as follows. With reference to FIG. 5, when speed shifting gear D6 is engaged (i.e., driven), the second clutch CL2 is engaged and synchronizer SL5 engages speed shifting gear D6. Torque from the input shaft IS2 is transferred by input gear G5 to the speed shifting gear D2. The speed shifting gear D2 transfers the torque to the first idle shaft IDS1 via the first idle input gear IDG1. Accordingly, the speed shifting gear D6 transfers the torque to the first output shaft OS1 via the second intermediate gear T2. Torque from the first output shaft OS1 is transferred to the final drive FD and the differential DIFF of the vehicle by the first output gear OG1.

Figure 6:
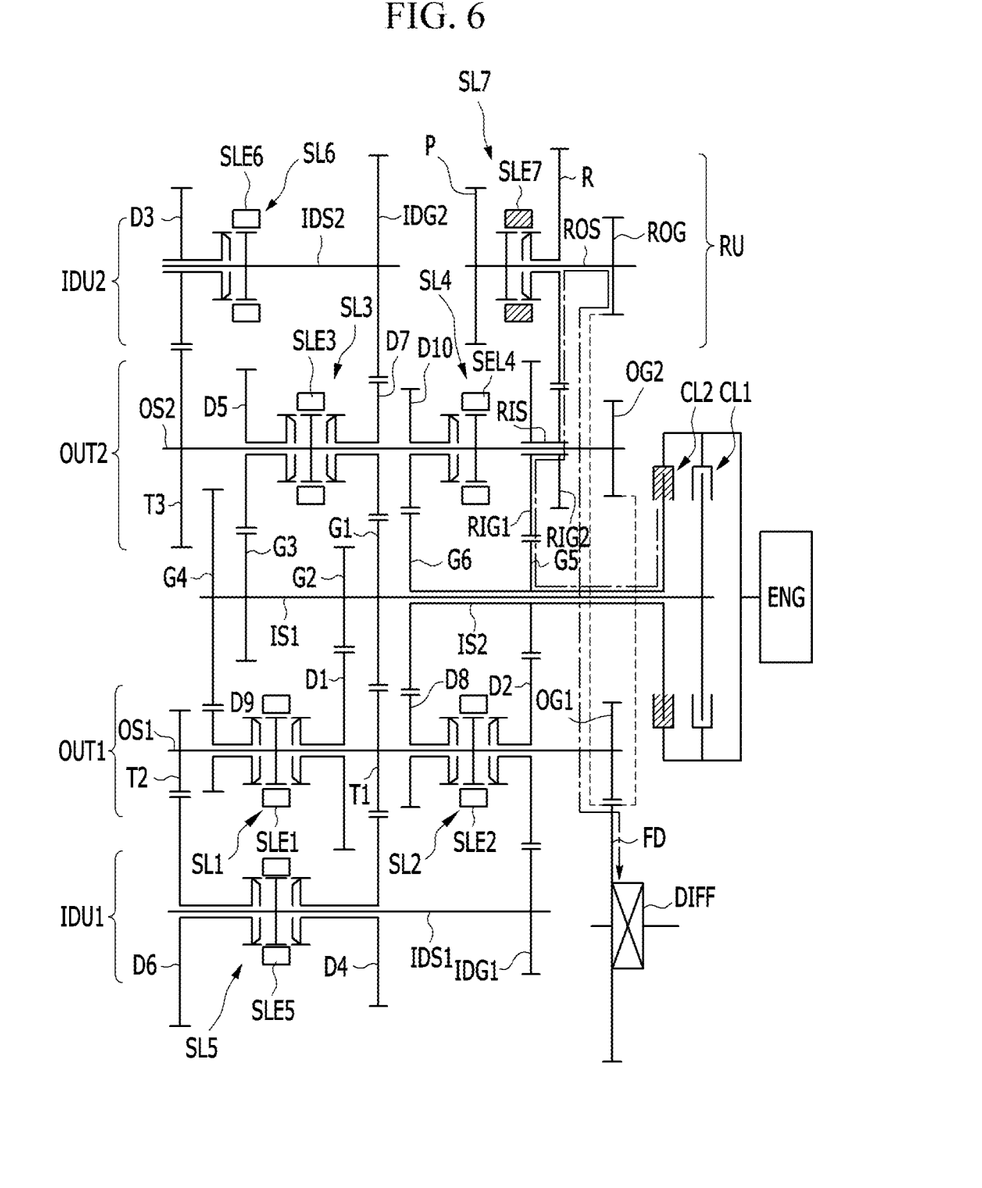
FIG. 6 is a power delivery path diagram at a reverse speed of a power transmission apparatus for a vehicle according to an exemplary embodiment of the present disclosure.

Similarly, with reference to FIG. 6, when the reverse speed shifting gear R is engaged (i.e., driven), the second clutch CL2 is engaged and synchronizer SL7 engages the reverse speed shifting gear R. Torque from the input shaft IS2 is transferred by input gear G5 to the first reverse idle gear RIG1. The first reverse idle gear RIG1 is connected to the second reverse idle gear RIG2 which transfers the torque to the reverse output shaft ROS via the reverse speed shifting gear R. Accordingly, the reverse output gear ROG transfers the torque directly to the final drive FD and the differential DIFF of the vehicle by the first output gear OG1.

FIG. 1 is a gear layout view of a power transmission apparatus for a vehicle according to an exemplary embodiment of the present disclosure.

Referring to FIG. 1, a power transmission apparatus according to an exemplary embodiment of the present disclosure includes a clutch unit including first and second clutches CL1 and CL2 so as to control torque transmission of a power source (engine or motor) ENG, an input unit including first and second input shafts IS1 and IS2, a shifting output unit including first and second shifting output devices OUT1 and OUT2 for shifting an input torque input through the input unit and for outputting the shifted torque according to respective shift-stages, first and second idle units IDU1 and IDU2 disposed adjacent to the shifting output unit, and a reverse speed unit RU.

For a manual or automatic transmission vehicle utilizing a typical internal combustion engine, the power source may be the engine, and for a hybrid vehicle such as an electric vehicle utilizing a motor, the power source may be the motor.

The first and second clutches CL1 and CL2 of the clutch unit selectively transmits the torque of the power source to the first and second input shafts IS1 and IS2 respectively.

The first clutch C1 selectively transmits the torque of the engine ENG to the first input shaft IS1, and the second clutch CL2 selectively transmit the torque of the engine ENG to the second input shaft IS2.

The first and second clutches CL1 and CL2 of the clutch unit may be typical multi-plate wet clutches, however, the scope of the disclosure is not limited thereto. A multi-plate dry clutch may also be used, where a hydraulic control system is utilized for its operation and release.

The input unit includes a first input shaft IS1 selectively connected with an output side of the power source ENG through the first clutch CL1, and a second input shaft IS2 selectively connected with the output side of the power source ENG through the first clutch CL2. The second input shaft IS2 may be in a form of a hollow shaft such that the first input shaft IS1 may be located coaxially inside second input shaft IS2 without a rotational interference.

First, second, third, and fourth input gears G1, G2, G3, and G4 are fixedly disposed on the first input shaft IS1, and at a rear of the second input shaft IS1, they are sequentially arranged in an order of the first, second, third, and fourth input gears G1, G2, G3, and G4.

Fifth and sixth input gears G5 and G6 are fixedly disposed on the second input shaft IS2, where the fifth input gear G5 is disposed forward and the sixth input gear G6 is disposed rearward.

As a result, when the first clutch CL1 operates, the first input shaft IS1 rotates and the first, second, third, and fourth input gears G1, G2, G3, and G4 are driven. When the second clutch CL2 operates, the second input shaft IS2 rotates and the fifth and sixth input gears G5 and G6 are driven.

The first, second, third, fourth, fifth, and sixth input gears G1, G2, G3, G4, G5, and G6 act input gears for respective shift-stages. The first input gear G1 is an input gear for the forward seventh speed and the forward third speed. The second input gear G2 is an input gear for the forward first speed. The third input gear G3 is an input gear for the forward fifth speed. The fourth input gear G4 is an input gear for the forward ninth speed.

The fifth input gear G5 is an input gear for the forward second speed, the forward fourth speed, the forward sixth speed, and the reverse speed. The sixth input gear G6 is an input gear for the forward eighth speed and the forward tenth speed.

Numbers of gear teeth of the input gears G1, G2, G3, G4, G5, and G6 are preset appropriately for respective shift-stages. The input gears G1, G2, G3, and G4 formed on the first input shaft IS1 realize odd-numbered shift-stages, and the input gears G5 and G6 formed on the second input shaft IS2 realize even-numbered shift-stages.

The first and second shifting output devices OUT1 and OUT2 of the shifting output unit are disposed parallel with the first and second input shafts IS1 and IS2.

The first shifting output device OUT1 includes a first output shaft OS1 disposed parallel with the first and second input shafts IS1 and IS2, forward first, second, eighth, and ninth speed shifting gears D1, D2, D8, and D9, first and second synchronizers SL1 and SL2, a first output gear OG1, and first and second intermediate gears T1 and T2.

The forward first speed shifting gear D1 and the forward ninth speed shifting gear D9 are rotatably disposed on the first output shaft OS1, and the first synchronizer SL1 selectively synchronizes the forward first speed shifting gear D1 and the forward ninth speed shifting gear D9 to the first output shaft OS1.

The forward second speed shifting gear D2 and the forward eighth speed shifting gear D8 are rotatably disposed on the first output shaft OS1, and the second synchronizer SL2 selectively synchronizes the forward second speed shifting gear D2 and the forward eighth speed shifting gear D8 to the first output shaft OS1.

The first output gear OG1 is fixedly formed at an upstream portion of the first output shaft OS1, the first intermediate gear T1 is fixedly formed at a central portion of the first output shaft OS1, and the second intermediate gear T2 is fixedly formed at a downstream portion of the first output shaft OS1.

The first synchronizer SL1 is disposed rearward to the second synchronizer SL2 on the first output shaft OS1. The forward first speed shifting gear D1 is externally engaged with the second input gear G2, and the forward ninth speed shifting gear D9 is externally engaged with the fourth input gear G4.

The second synchronizer SL2 is disposed forward to the first synchronizer SL1 on the first output shaft OS1. The forward second speed shifting gear D2 is externally engaged with the fifth input gear G5, and the forward eighth speed shifting gear D8 is externally engaged with the sixth input gear G6.

The first output gear OG1 outputs the torque received from the first output shaft OS1 to a differential DIFF through a final drive gear FD.

The second shifting output device OUT2 includes a second output shaft OS2 disposed parallel with the first and second input shafts IS1 and IS2, forward fifth, seventh, and tenth speed shifting gears D5, D7, and D10, third and fourth synchronizers SL3 and SL4, a second output gear OG2, and a third intermediate gear T3.

The forward fifth speed shifting gear D5 and the forward seventh speed shifting gear D7 are rotatably disposed on the second output shaft OS2, and the third synchronizer SL3 selectively synchronizes the forward fifth speed shifting gear D5 and the forward seventh speed shifting gear D7 to the second output shaft OS2.

The forward tenth speed shifting gear D10 is rotatably disposed on the second output shaft OS2, and the fourth synchronizer SL4 selectively synchronizes the forward tenth speed shifting gear D10 to the second output shaft OS2.

The second output gear OG2 is fixedly formed at an upstream portion of the second output shaft OS2, and the third intermediate gear T3 is fixedly formed at a downstream portion of the second output shaft OS2.

The third synchronizer SL3 is disposed rearward to the fourth synchronizer SL4 on the second output shaft OS2. The forward fifth speed shifting gear D5 is externally engaged with the third input gear G3, and the forward seventh speed shifting gear D7 is externally engaged with the first input gear G1.

The fourth synchronizer SL4 is disposed forward to the third synchronizer SL3 on the second output shaft OS2. The forward tenth speed shifting gear D10 is externally engaged with the sixth input gear G6.

The second output gear OG2 outputs the torque received from the second output shaft OS2 to the differential DIFF through the final drive gear FD.

The first output gear OG1 and the second output gear OG2 are externally engaged with the final drive gear FD so as to realize a final reduction, and the torque of the final drive gear FD is transmitted to drive-wheels through the differential DIFF.

The first idle unit IDU1 includes a first idle shaft IDS1 disposed parallel with the first output shaft OS1.

A first idle input gear IDG1, a forward fourth speed shifting gear D4, a forward sixth speed shifting gear D6, and a fifth synchronizer SL5 are arranged on the first idle shaft IDS1.

The first idle input gear IDG1 is fixedly disposed on the first idle shaft IDG1 and externally engaged with the forward second speed shifting gear D2.

The forward fourth speed shifting gear D4 and the forward sixth speed shifting gear D6 are rotatably disposed on the first idle shaft IDS1.

The forward fourth speed shifting gear D4 is externally engaged with the first intermediate gear T1 fixed on the first output shaft OS1, and the forward sixth speed shifting gear D6 is externally engaged with the second intermediate gear T2 fixed on the first output shaft OS1.

The fifth synchronizer SL5 selectively synchronizes the forward fourth speed shifting gear D4 and the forward sixth speed shifting gear D6 to the first idle shaft IDS1.

The second idle unit IDU2 includes a second idle shaft IDS2 disposed parallel with the second output shaft OS2.

A second idle input gear IDG2, a forward third speed shifting gear D3, and a sixth synchronizer SL6 are arranged on the second idle shaft IDS2.

The second idle input gear IDG2 is fixedly disposed on the second idle shaft IDG2 and externally engaged with the forward seventh speed shifting gear D7.

The forward third speed shifting gear D3 is rotatably disposed on the second idle shaft IDS2, and externally engaged with the third intermediate gear T3 fixed on the second output shaft OS2.

The sixth synchronizer SL6 selectively synchronizes the forward third speed shifting gear D3 to the second idle shaft IDS2.

The reverse speed unit RU includes a reverse idle shaft RIS coaxially and rotatably disposed on the second output shaft OS2, and a reverse output shaft ROS disposed parallel with the second output shaft OS2.

The reverse idle shaft RIS may be formed as a hollow shaft receiving the second output shaft OS2 so as to prevent rotational interference.

A first reverse idle gear RIG1 and a second reverse idle gear RIG2 are fixedly formed on the reverse idle shaft RIS.

A reverse speed shifting gear R is rotatably disposed on a central portion of the reverse output shaft ROS.

The first reverse idle gear RIG1 is externally engaged with the fifth input gear G5 on the second input shaft IS1, and the second reverse idle gear RIG2 is externally engaged with the reverse speed shifting gear R.

The first reverse idle gear RIG1 is formed larger than fifth input gear G5, and the reverse speed shifting gear R is formed larger than the second reverse idle gear RIG2. Thus, speed reduction is realized when a torque is transmitted from the second input shaft IS2 to the reverse speed shifting gear R.

A seventh synchronizer SL7 is formed on the reverse output shaft ROS so as to selectively synchronize the reverse speed shifting gear R to the reverse output shaft ROS.

A reverse output gear ROG is fixedly formed on the reverse output shaft ROS. The same as in the first output gear OG1 and the second output gear OG2, the reverse output gear ROG is externally engaged with the final drive gear FD so as to realize a final reduction, and the torque of the final drive gear FD is transmitted to drive-wheels through the differential DIFF.

The first, second, third, fourth, fifth, sixth, and seventh synchronizers SL1 to SL7 may be formed as a known scheme, and respective sleeves SLE1, SLE2, SLE3, SLE4, SLE5, SLE6, and SLE7 applied to the first, second, third, fourth, fifth, sixth, and seventh synchronizers SL1 to SL7 may be operated by actuators that may be controlled by a transmission control unit.

The reference symbol P in the drawings indicates a parking gear.

Figure 2:
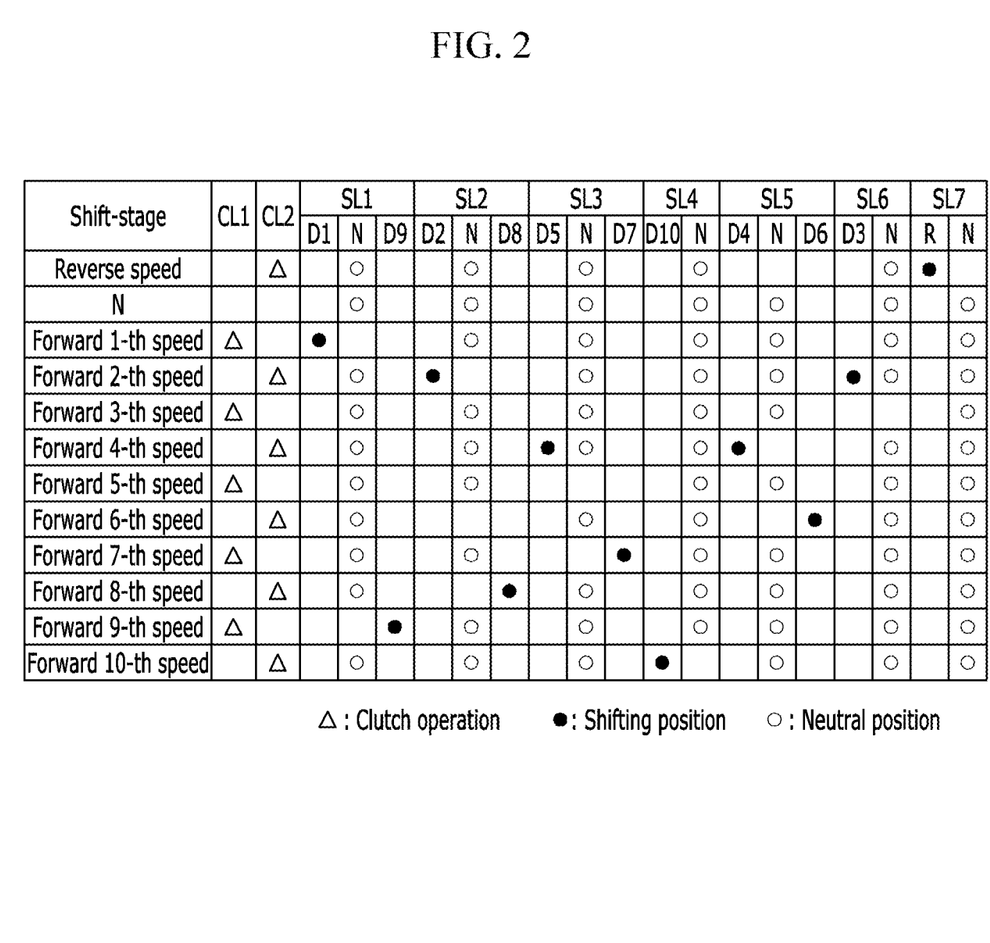
FIG. 2 is an operational chart of a power transmission apparatus for a vehicle according to an exemplary embodiment of the present disclosure.

FIG. 2 is an operational chart of a power transmission apparatus for a vehicle according to an exemplary embodiment of the present disclosure.

Operations in respective shift-stages of a power transmission apparatus for a vehicle according to an exemplary embodiment of the present disclosure is hereinafter described in detail with reference to FIG. 2.

[Forward First Speed]

Firstly, for the forward first speed, the forward first speed shifting gear D1 and the first output shaft OS1 are synchronized by the sleeve SLE1 of the first synchronizer SL1, and the first clutch CL1 is operated.

[Forward Second Speed]

For shifting from the forward first speed to the forward second speed, the forward second speed shifting gear D2 and the first output shaft OS1 are synchronized by the sleeve SLE2 of the second synchronizer SL2. Then, the operation of the first clutch CL1 is released and the second clutch CL2 is operated, thereby realizing the shifting to the forward second speed.

When shifting to the forward second speed is finished, the sleeve SLE1 of the first synchronizer SL1 is moved to a neutral position N.

[Forward Third Speed]

For shifting from the forward second speed to the forward third speed, the forward third speed shifting gear D3 externally engaged with the third intermediate gear T3 is synchronized with the second idle shaft IDS2 by the sleeve SLE6 of the sixth synchronizer SL6. Then, the operation of the second clutch CL2 is released and the first clutch CL1 is operated, thereby realizing the shifting to the forward third speed.

When shifting to the forward third speed is finished, the sleeve SLE2 of the second synchronizer SL2 is moved to a neutral position N.

[Forward Fourth Speed]

For shifting from the forward third speed to the forward fourth speed, the forward fourth speed shifting gear D4 externally engaged with the first intermediate gear T1 is synchronized with the first idle shaft IDS1 by the sleeve SLE5 of the fifth synchronizer SL5. Then, the operation of the first clutch CL1 is released and the second clutch CL2 is operated, thereby realizing the shifting to the forward fourth speed.

When shifting to the forward fourth speed is finished, the sleeve SLE6 of the sixth synchronizer SL6 is moved to a neutral position N.

[Forward Fifth Speed]

For shifting from the forward fourth speed to the forward fifth speed, the forward fifth speed shifting gear D5 and the second output shaft OS2 are synchronized by the sleeve SLE3 of the third synchronizer SL3. Then, the operation of the second clutch CL2 is released and the first clutch CL1 is operated, thereby realizing the shifting to the forward fifth speed.

When shifting to the forward fifth speed is finished, the sleeve SLE5 of the fifth synchronizer SL5 is moved to a neutral position N.

[Forward Sixth Speed]

For shifting from the forward fifth speed to the forward sixth speed, the forward sixth speed shifting gear D6 externally engaged with the second intermediate gear T2 is synchronized with the first idle shaft IDS1 by the sleeve SLE5 of the fifth synchronizer SL5. Then, the operation of the first clutch CL1 is released and the second clutch CL2 is operated, thereby realizing the shifting to the forward sixth speed.

When shifting to the forward sixth speed is finished, the sleeve SLE3 of the third synchronizer SL3 is moved to a neutral position N.

[Forward Seventh Speed]

For shifting from the forward sixth speed to the forward seventh speed, the forward seventh speed shifting gear D7 and the second output shaft OS2 are synchronized by the sleeve SLE3 of the third synchronizer SL3. Then, the operation of the second clutch CL2 is released and the first clutch CL1 is operated, thereby realizing the shifting to the forward seventh speed.

When shifting to the forward seventh speed is finished, the sleeve SLE7 of the seventh synchronizer SL7 is moved to a neutral position N.

[Forward Eighth Speed]

For shifting from the forward seventh speed to the forward eighth speed, the forward eighth speed shifting gear D8 and the first output shaft OS1 are synchronized by the sleeve SLE2 of the second synchronizer SL2. Then, the operation of the first clutch CL1 is released and the second clutch CL2 is operated, thereby realizing the shifting to the forward eighth speed.

When shifting to the forward eighth speed is finished, the sleeve SLE3 of the third synchronizer SL3 is moved to a neutral position N.

[Forward Ninth Speed]

For shifting from the forward eighth speed to the forward ninth speed, the forward ninth speed shifting gear D9 and the first output shaft OS1 are synchronized by the sleeve SLE1 of the first synchronizer SL1. Then, the operation of the second clutch CL2 is released and the first clutch CL1 is operated, thereby realizing the shifting to the forward ninth speed.

When shifting to the forward ninth speed is finished, the sleeve SLE2 of the second synchronizer SL2 is moved to a neutral position N.

[Forward Tenth Speed]

For shifting from the forward ninth speed to the forward tenth speed, the forward tenth speed shifting gear D10 and the second output shaft OS2 are synchronized by the sleeve SLE4 of the fourth synchronizer SL4. Then, the operation of the first clutch CL1 is released and the second clutch CL2 is operated, thereby realizing the shifting to the forward tenth speed.

When shifting to the forward tenth speed is finished, the sleeve SLE1 of the first synchronizer SL1 is moved to a neutral position N.

[Reverse Speed]

For the reverse speed, the reverse speed shifting gear R and the reverse output shaft ROS are synchronized by the sleeve SLE7 of the seventh synchronizer SL7, and second clutch CL2 is operated.

Figure 3:
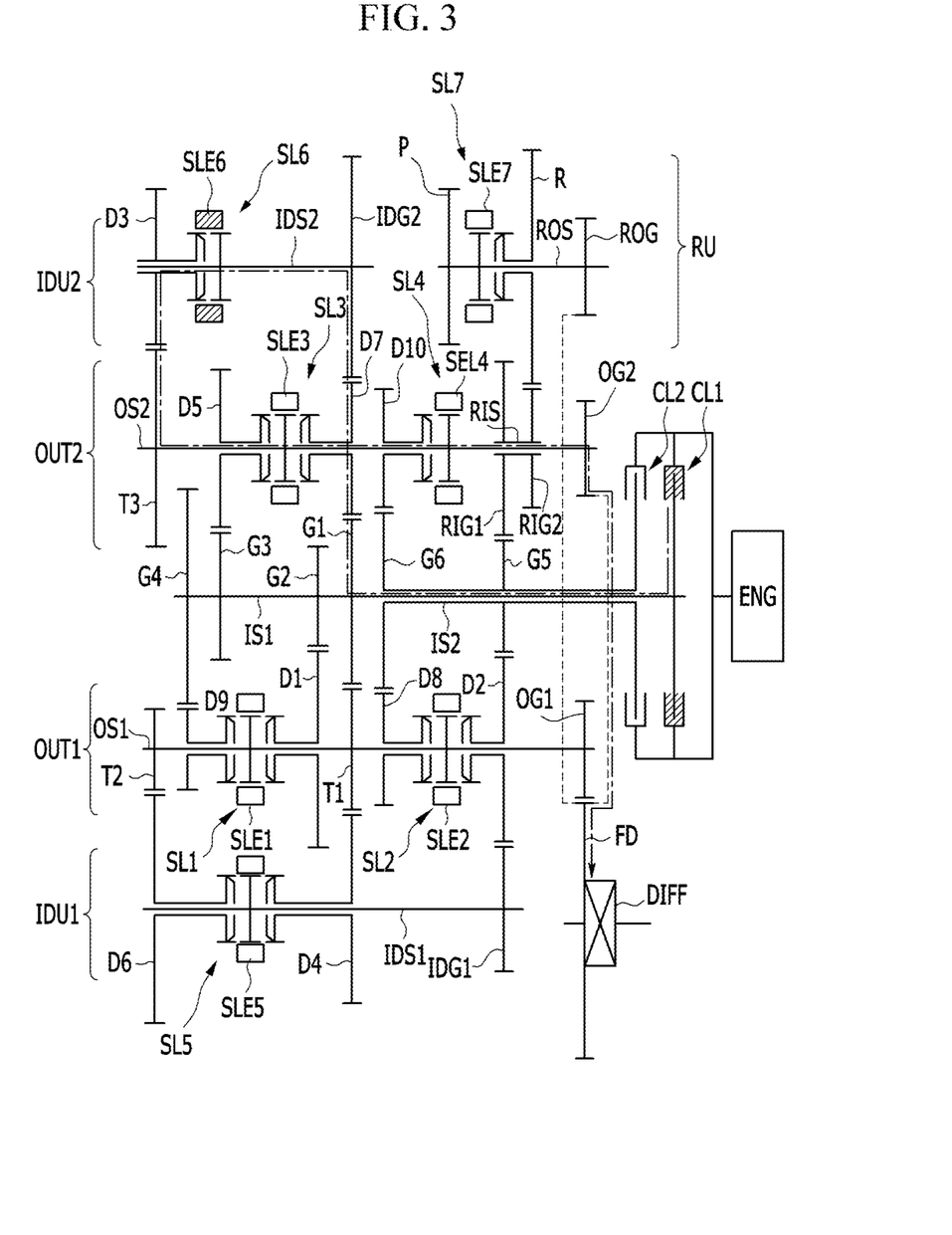
FIG. 3 is a power delivery path diagram at a forward third speed of a power transmission apparatus for a vehicle according to an exemplary embodiment of the present disclosure.

FIG. 3 is a power delivery path diagram at a forward third speed of a power transmission apparatus for a vehicle according to an exemplary embodiment of the present disclosure.

Referring to FIG. 2 and FIG. 3, for shifting to the forward third speed, the forward third speed shifting gear D3 and the second idle shaft IDS2 are synchronized by the sleeve SLE6 of the sixth synchronizer SL6, and the first clutch CL1.

In this case, the torque of the engine ENG as a power source is sequentially transmitted through the first clutch CL1, the first input shaft IS1, the first input gear G1, the forward seventh speed shifting gear D7, the second idle input gear IDG2, the second idle shaft IDS2, the sixth synchronizer SL6, the forward third speed shifting gear D3, the third intermediate gear T3, the second output shaft OS2, second output gear OG2, the final drive gear FD, and the differential DIFF.

Figure 4:
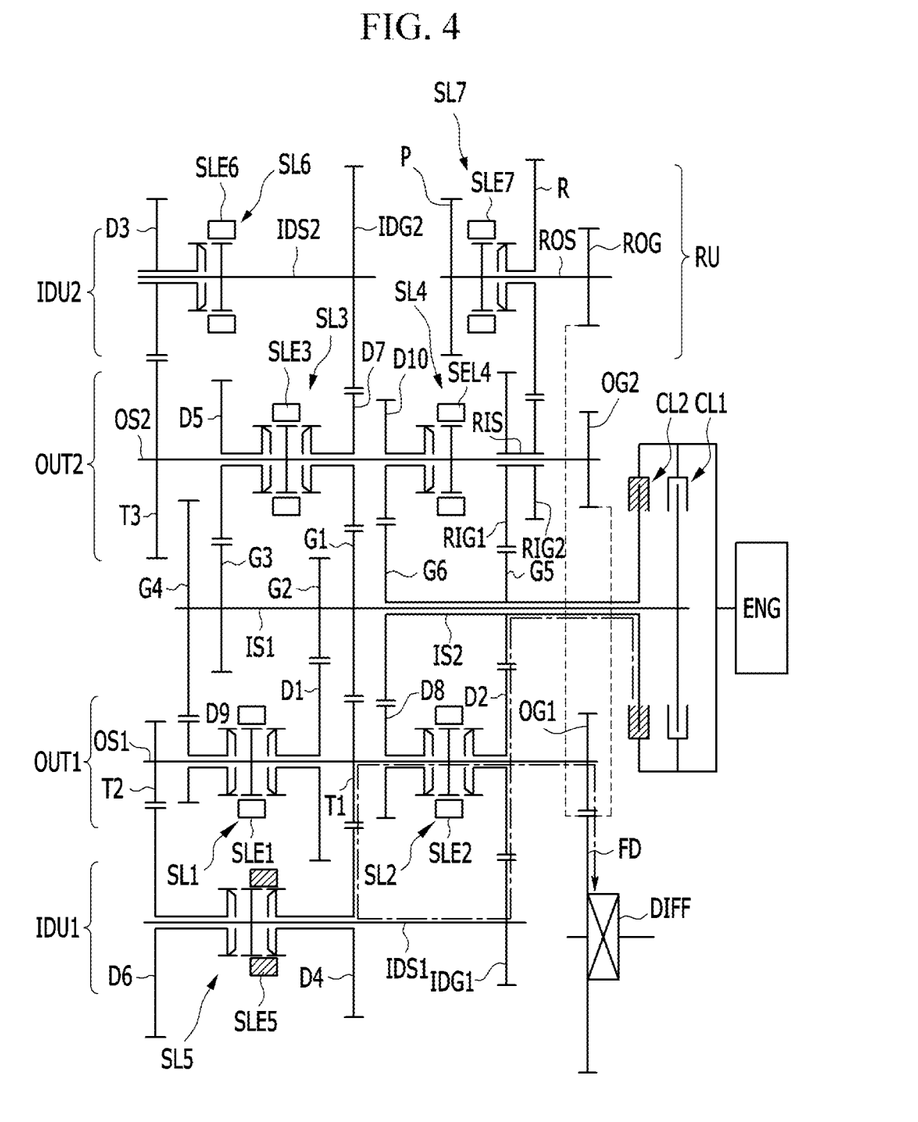
FIG. 4 is a power delivery path diagram at a forward fourth speed of a power transmission apparatus for a vehicle according to an exemplary embodiment of the present disclosure.

FIG. 4 is a power delivery path diagram at a forward fourth speed of a power transmission apparatus for a vehicle according to an exemplary embodiment of the present disclosure.

Referring to FIG. 2 and FIG. 4, for shifting to the forward fourth speed, the forward fourth speed shifting gear D4 and the first idle shaft IDS1 are synchronized by the sleeve SLE5 of the fifth synchronizer SL5, and the second clutch CL2.

In this case, the torque of the engine ENG as a power source is sequentially transmitted through the second clutch CL2, the second input shaft IS2, the fifth input gear G5, the forward second speed shifting gear D2, the first idle input gear IDG1, the first idle shaft IDS1, the fifth synchronizer SL5, the forward fourth speed shifting gear D4, the first intermediate gear T1, the first output shaft OS1, the first output gear OG1, the final drive gear FD, and the differential DIFF.

FIG. 5 is a power delivery path diagram at a forward sixth speed of a power transmission apparatus for a vehicle according to an exemplary embodiment of the present disclosure.

Referring to FIG. 2 and FIG. 5, for shifting to the forward sixth speed, the forward sixth speed shifting gear D6 and the first idle shaft IDS1 are synchronized by the sleeve SLE5 of the fifth synchronizer SL5, and the second clutch CL2.

In this case, the torque of the engine ENG as a power source is sequentially transmitted through the second clutch CL2, the second input shaft IS2, the fifth input gear G5, the forward second speed shifting gear D2, the first idle input gear IDG1, the first idle shaft IDS1, the fifth synchronizer SL5, the forward sixth speed shifting gear D6, the second intermediate gear T2, the first output shaft OS1, the first output gear OG1, the final drive gear FD, and the differential DIFF.

FIG. 6 is a power delivery path diagram at a reverse speed of a power transmission apparatus for a vehicle according to an exemplary embodiment of the present disclosure.

Referring to FIG. 2 and FIG. 6, for shifting to the reverse speed, the reverse speed shifting gear R and the reverse output shaft ROS are synchronized by the sleeve SLE7 of the seventh synchronizer SL7, and the second clutch CL2.

In this case, the torque of the engine ENG as a power source is sequentially transmitted through the second clutch CL2, the second input shaft IS2, the fifth input gear G5, the first and second reverse idle gears RIG1 and RIG2, the reverse speed shifting gear R, the seventh synchronizer SL7, the reverse output shaft ROS, the reverse output gear ROG, the final drive gear FD, and the differential DIFF.

As described above, a power transmission apparatus for a vehicle according to an exemplary embodiment of the present disclosure realizes ten forward speeds and one reverse speed, by dispersedly disposing three synchronizers and gears, related to forward third, fourth, and sixth speeds, on two idle shafts and one reverse output shaft, and by allowing the fourth synchronizer SL4 disposed on the second output shaft only to perform one shift-stage. Thus, the number of parts may be minimized, and thereby a length of the power transmission apparatus may also be minimized.

In addition, the increase of the number of parts and weight may be suppressed so as to reduce production cost, and installability of a power transmission apparatus may be improved due to shortened length.

In addition, effective power transmission and improvement of fuel consumption may be achieved by realizing multi-stages of ten forward speeds and one reverse speed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

CL1, CL2: first and second clutches
D1, D2, D3, D4, D5, D6, D7, D8, D9, D10: first, second, third, fourth, fifth, sixth, seventh, eighth, ninth, and tenth speed shifting gears
G1, G2, G3, G4, G5, G6: first, second, third, fourth, fifth, and sixth input gears
IDG1, IDG2: first and second idle input gears IDS1, IDS2: first, second, and third idle shafts
IDU1, IDU2: first and second idle units
T1, T2, T3: first, second, and third intermediate gears
RU: reverse speed unit
R: reverse speed shifting gear
ROS: reverse output shaft
ROG: reverse output gear
RIS: reverse idle shaft
RIG1, RIF2: first and second reverse idle gears
IS1, IS2: first and second input shafts
OG1, OG2: first and second output gears
OS1, OS2: first and second output shafts
OUT1, OUT2: first and second shifting output devices
SL1, SL2, SL3, SL4, SL5, SL6, SL7: first, second, third, fourth, fifth, sixth, and seventh synchronizers

What is claimed is:

1. A power transmission apparatus for a vehicle, comprising:
    a first input shaft disposed with a plurality of input gears and selectively connected with an output side of a power source by a first clutch;
    a second input shaft disposed with a plurality of input gears and selectively connected with the output side of the power source by a second clutch, the second input shaft being axially disposed with the first input shaft;
    a first shifting output device including at least two shifting gears disposed on a first output shaft and first and second intermediate gears fixed to the first output shaft, the at least two shifting gears disposed on the first output shaft being externally engaged with a first group of the input gears on the first and second input shafts, the at least two shifting gears disposed on the first output shaft being selectively synchronized with the first output shaft;
    a second shifting output device including at least two shifting gears disposed on a second output shaft and a third intermediate gear fixed to the second output shaft, the at least two shifting gears disposed on the second output shaft being externally engaged with a second group of the input gears on the first and second input shafts, the at least two shifting ears disposed on the second output shaft being selectively synchronized with the second output shaft;
    a first idle unit including a first idle input gear fixed to a first idle shaft and two shifting gears externally engaged with the first and second intermediate gears and selectively synchronized with the first idle shaft, the first idle input gear being externally engaged with one of the at least two shifting gears on the first output shaft;
    a second idle unit including a second idle input gear fixed to a second idle shaft and a shifting gear externally engaged with the third intermediate gear and selectively synchronized with the second idle shaft, the second idle input gear being externally engaged with one of the at least two shifting gears on the second output shaft; and
    a reverse speed unit including first and second reverse idle gears fixed to a reverse idle shaft and a reverse speed shifting gear disposed on and selectively synchronized with a reverse output shaft, the reverse idle shaft being coaxial with and rotatable with respect to the second output shaft, the reverse speed shifting gear receiving a torque of the second input shaft through the first and second reverse idle gears.

2. The power transmission apparatus of claim 1, wherein:
    first, second, third, and fourth input gears are sequentially disposed on the first input shaft;
    fifth and sixth input gears are disposed on the second input shaft;
    the first input gear is one of the plurality of input gears on the first input shaft for realizing a forward seventh speed and a forward third speed;
    the second input gear is one of the plurality of input gears on the first input shaft for realizing a forward first speed;
    the third input gear is one of the plurality of input gears on the first input shaft for realizing a forward fifth speed;
    the fourth input gear is one of the plurality of input gears on the first input shaft for realizing a forward ninth speed;
    the fifth input gear is one of the plurality of input gears on the second input shaft for realizing a forward second speed, a forward fourth speed, a forward sixth speed, and a reverse speed; and
    the sixth input gear is one of the plurality of input gears on the second input shaft for realizing a forward eighth speed and a forward tenth speed.

3. The power transmission apparatus of claim 2,
    wherein the first shifting output device comprises a forward first speed shifting gear and a forward ninth speed shifting gear disposed on the first output shaft, a first synchronizer for selectively synchronizing the forward first speed shifting gear and the forward ninth speed shifting gear to the first output shaft, a forward second speed shifting gear and a forward eighth speed shifting gear disposed on the first output shaft, a second synchronizer for selectively synchronizing the forward second speed shifting gear and the forward eighth speed shifting gear to the first output shaft, and a first output gear fixed to the first output shaft, wherein the at least two shifting gears of the first shifting output device comprise the forward first speed shifting gear, the forward second speed shifting gear, the forward eighth speed shifting gear and the forward ninth speed shifting gear; and
    wherein the second shifting output device comprises a forward fifth speed shifting gear and a forward seventh speed shifting gear disposed on the second output shaft, a third synchronizer selectively synchronizing the forward fifth speed shifting gear and the forward seventh speed shifting gear to the second output shaft, a forward tenth speed shifting gear disposed on the second output shaft, a fourth synchronizer selectively synchronizing the forward tenth speed shifting gear to the second output shaft, and a second output gear fixed to the second output shaft, wherein the at least two shifting gears of the second shifting output device comprises the forward fifth speed shifting gear, the forward seventh speed shifting gear and the forward tenth speed shifting gear.

4. The power transmission apparatus of claim 3, wherein:
in the first shifting output device, the forward first speed shifting gear is externally engaged with the second input gear, the forward ninth speed shifting gear is externally engaged with the fourth input gear, the forward second speed shifting gear is externally engaged with the fifth input gear, and the forward eighth speed shifting gear is externally engaged with the sixth input gear; and
in the second shifting output device, the forward fifth speed shifting gear is externally engaged with the third input gear, the forward seventh speed shifting gear is externally engaged with the first input gear, and the forward tenth speed shifting gear is externally engaged with the sixth input gear.

5. The power transmission apparatus of claim 3, wherein, in the first idle unit:
the first idle shaft is disposed parallel with the first output shaft;
the first idle input gear is fixed to the first idle shaft and externally engaged with the forward second speed shifting gear on the first output shaft;
the two shifting gears of the first idle unit comprises a forward fourth speed shifting gear and a forward sixth speed shifting gear;
the forward fourth speed shifting gear is rotatably disposed on a central portion of the first idle shaft and externally engaged with the first intermediate gear on the first output shaft;
the forward sixth speed shifting gear is rotatably disposed on the first idle shaft and externally engaged with the second intermediate gear on the first output shaft; and
a fifth synchronizer selectively synchronizes the forward fourth speed shifting gear and the forward sixth speed shifting gear to the first idle shaft.

6. The power transmission apparatus of claim 3, wherein, in the second idle unit:
the second idle shaft is disposed parallel with the second output shaft;
the second idle input gear is fixed to the second idle shaft and externally engaged with the forward seventh speed shifting gear on the second output shaft;
the shifting gear of the second idle unit comprises a forward third speed shifting gear rotatably disposed on the second idle shaft and externally engaged with the third intermediate gear on the second output shaft; and
a sixth synchronizer selectively synchronizes the forward third speed shifting gear to the second idle shaft.

7. The power transmission apparatus of claim 3, wherein, in the reverse speed unit:
the reverse idle shaft is coaxial with and rotatable with respect to the second output shaft;
the first reverse idle gear is fixed to the reverse idle shaft and externally engaged with the fifth input gear on the second input shaft;
the second reverse idle gear is fixed to the reverse idle shaft;
the reverse output shaft is disposed parallel with the second output shaft;
the reverse speed shifting gear is rotatably disposed on a central portion of the reverse output shaft and externally engaged with the second reverse idle gear;
a seventh synchronizer selectively synchronizes the reverse speed shifting gear to the reverse output shaft; and
a reverse output gear is fixed to the reverse output shaft.

8. The power transmission apparatus of claim 1, wherein the reverse idle shaft is formed as a hollow shaft and overlaps an upstream portion of the second output shaft.

9. The power transmission apparatus of claim 1, wherein the first reverse idle gear is larger than the second reverse idle gear in a diameter.

10. The power transmission apparatus of claim 6, wherein the forward third speed is realized by synchronizing the forward third speed shifting gear to the second idle shaft by the operation of the sixth synchronizer and then operating the first clutch.

11. The power transmission apparatus of claim 5, wherein the forward fourth speed is realized by synchronizing the forward fourth speed shifting gear to the first idle shaft by the operation of the fifth synchronizer and then operating the second clutch.

12. The power transmission apparatus of claim 5, wherein the forward sixth speed is realized by synchronizing the forward sixth speed shifting gear to the first idle shaft by the operation of the fifth synchronizer and then operating the second clutch.

13. The power transmission apparatus of claim 7, wherein the reverse speed is realized by synchronizing the reverse speed shifting gear to the reverse output shaft by the operation of the seventh synchronizer and then operating the second clutch.

* * * * *